(12) United States Patent
Choi (10) Patent No.: US 10,415,708 B2
(45) Date of Patent: Sep. 17, 2019

(54) CONE VALVE AND MANUFACTURING METHOD THEREOF

(71) Applicant: Sang Jin Choi, Busan (KR)

(72) Inventor: Sang Jin Choi, Busan (KR)

( * ) Notice: Subject to any disclaimer, the term of this patent is extended or adjusted under 35 U.S.C. 154(b) by 95 days.

(21) Appl. No.: 15/034,343

(22) PCT Filed: Feb. 18, 2014

(86) PCT No.: PCT/KR2014/001285
§ 371 (c)(1),
(2) Date: May 4, 2016

(87) PCT Pub. No.: WO2015/064851
PCT Pub. Date: May 7, 2015

(65) Prior Publication Data
US 2016/0273660 A1    Sep. 22, 2016

(30) Foreign Application Priority Data

Nov. 4, 2013  (KR) .................. 10-2013-0132839
Nov. 4, 2013  (KR) .................. 10-2013-0132872
Nov. 4, 2013  (KR) .................. 10-2013-0132891

(51) Int. Cl.
*F16K 1/12*       (2006.01)
*F16K 31/53*      (2006.01)
*F16K 1/38*       (2006.01)

(52) U.S. Cl.
CPC .............. *F16K 1/12* (2013.01); *F16K 31/53* (2013.01); *F16K 1/385* (2013.01)

(58) Field of Classification Search
CPC . F16K 1/12; F16K 31/53; F16K 1/123; F16K 1/38; F16K 1/385; F16K 3/22; F16K 3/316; F16K 5/0242

USPC ............................................. 251/249.5, 366
See application file for complete search history.

(56) References Cited

U.S. PATENT DOCUMENTS

| 4,063,707 | A | * | 12/1977 | Zouzoulas | F16K 31/048 251/79 |
| 4,565,210 | A | * | 1/1986 | Heine | F16K 1/12 137/219 |
| 6,029,691 | A | * | 2/2000 | Tavor | F16K 1/12 137/219 |

(Continued)

FOREIGN PATENT DOCUMENTS

| EP | 0230849 A1 * | 8/1987 | .............. F16K 1/12 |
| GB | 191227603 A * | 4/1913 | .............. F16K 1/12 |

(Continued)

OTHER PUBLICATIONS

Translation of EP 0230849 (Year: 2019).*

*Primary Examiner* — Kevin F Murphy
*Assistant Examiner* — Kelsey E Cary
(74) *Attorney, Agent, or Firm* — Innovation Counsel LLP (57) ABSTRACT

Disclosed herein are a cone valve and a manufacturing method thereof, wherein a cone which is installed inside a hollow body unit through which fluid flows, wherein the body unit is provided with left and right bodies, and the cone is disposed between the left and right bodies, left and right valve inclination surfaces are defined, inclined corresponding to an inclination surface of the cone, at the front ends of the left and right bodies, whereupon the cone can reciprocate forward and backward, thus opening or closing a flow passage.

15 Claims, 8 Drawing Sheets

(56) References Cited

U.S. PATENT DOCUMENTS

| | | | | |
|---|---|---|---|---|
| 6,471,182 B1 * | 10/2002 | McIntosh | ............ | F16K 31/046 251/129.12 |
| 8,286,937 B2 * | 10/2012 | Forster | .................... | F16K 1/12 137/219 |
| 2005/0269543 A1 * | 12/2005 | McCarty | ................ | F16K 1/123 251/231 |
| 2010/0102259 A1 * | 4/2010 | Forster | .................... | F16K 1/12 251/129.01 |

FOREIGN PATENT DOCUMENTS

| | | | |
|---|---|---|---|
| KR | 1981-0001345 | Y1 | 9/1981 |
| KR | 20-0333035 | Y1 | 11/2003 |

* cited by examiner

Open State

Figure 6

Closed State

Figure 7

SECTION
A'-A"

CONE VALVE AND MANUFACTURING METHOD THEREOF

CROSS-REFERENCE TO RELATED APPLICATION

This application claims under 35 U.S.C. § 119(a) and the benefit of PCT Patent Application PCT/KR 2014/001285 filed in the Korean Intellectual Property Office on Feb. 18, 2014 which claims priority to Korean Patent Application No. 10-2013-0132839, 10-2016-0132872 and 10-2013-0132891 filed on Nov. 4, 2013, the entire contents of which are incorporated herein by reference.

BACKGROUND

(a) Technical Field

The present inventive concept relates to a cone valve wherein a cone is installed inside a body unit of a cone valve, and a flow passage can be opened or closed since the cone reciprocates forward or backward inside the body unit by a driving force of a motor or a handle, and in particular to a manufacturing method of the cone valve wherein a cone is installed inside a body unit of a cone valve, and a flow passage can be opened or closed since the cone reciprocates forward or backward inside the body unit by a driving force of a motor or a handle.

(b) Background Art

There are various kinds of opening and closing valves which are able to open or close the flow passage of fluid. Among such opening and closing valves, a cone valve will be described. The Korean utility model laid-open No. 1981-0001345 describes a cone valve wherein a grooved part is formed at a flange defined at a front end surface of a sleeve gate, and a rubber seal is inserted and fixed in place. A shuttling unit is disposed at the grooved part, and the backside thereof is pressurized by a bolt. The pressurizing degree between the rubber seal and a protruded part is adjusted, whereby the cone valve is axially supported by a bearing housing wherein a dual screw shaft is extended, and a front end thereof is mounted at a sealing plate.

Moreover, the Korean utility model laid-open No. 20-0333035 describes a cone valve wherein fluid is discharged as it is sprayed by a conical dispersion plate inside a cylindrical valve body. In a state where the fluid sprayed by the dispersion plate is contacting with the rim of a body seat coupled to an exit of the valve body, the flow of the fluid is opened or closed while adjusting an interval based on leftward or rightward movement, whereby the fluid can be discharged in a sprayed form with the aid of a cylinder gate which is provided to open or close the flow of the fluid. There is further provided a spraying guide cover disposed at a rear end of the cylinder gate from which the fluid is discharged in a sprayed form, so as to guide the fluid dispersed by the dispersion plate to be discharged toward a central portion, not sprayed outward.

The aforementioned cone valves, however, have complicated configurations, which may lead to a hard-to-manufacture procedure, while causing a difficulty during operations. The opening and closing operations are slow, and leakage may occur due to turbulence and an abrasion of a valve seat, for which errors may occur often, and maintenance may cost a lot.

SUMMARY OF THE DISCLOSURE

The present inventive concept has been made in an effort to solve the above-described problems associated with prior art.

It is an object of the present inventive concept to provide a cone valve wherein a valve has a simple configuration, which may contribute to an easier manufacturing and operation, and turbulence may rarely occur, and any abrasion of a valve seat can be minimized, and since a cone inside a body unit is able to reliably open or close the flow passage, errors may occur less, and maintenance cost can be saved.

It is another object of the present inventive concept to provide a cone valve wherein the number of necessary components is less, and configuration is simple, and manufacturing and operations may be easier, and turbulence rarely occurs during the opening and closing, and abrasion damage to a valve seat is less. Since the cone inside a body unit is able to reliably open or close the flow passage, errors are less, and maintenance cost can be saved a lot.

It is further another object of the present inventive concept to provide a method for manufacturing a cone valve wherein the number of necessary valve components is less, and a valve configuration is simple, and manufacturing is easier, and operation is convenient. Moreover, any turbulence can be minimized during the opening or closing, and abrasion damage to a valve seat is minimized. Since a cone is able to fast and surely open or close the flow passage, error may occur less, and any maintenance cost can be saved, and the cone can be more easily manufactured.

To achieve the above objects, there is provided a cone valve, which may include, but is not limited to, a hollow body unit, the hollow body unit including a left body and a right body having a fluid outlet port and a fluid inlet port, respectively, the left body and the right body including a left valve inclination surface and a right valve inclination surface, respectively, a cone disposed inside the hollow body unit in a apace between the left body and the right body, the cone including an expansion part and a contraction part respectively opposing the left valve inclination surface and a right valve inclination surface, the expansion part and the contraction part being inclined corresponding to the left valve inclination surface and the right valve inclination surface, respectively, a cylindrical forward and backward movement unit movably connected to an outside circumference of the hollow body, a fixing piece connecting the cone and the cylindrical forward and backward movement unit, and a power transfer shaft engaged with the cylindrical forward and backward movement unit, the power transfer shaft moving the cylindrical forward and backward movement unit to open and close the cone valve The cone valve may further include a flange installed at both ends of the body unit.

The cone valve may further include a driving gear engaged with the power transfer shaft, an external worm gear rotationally engaged with the driving gear, and a worm engaged with the external worm gear.

A diameter of the expansion part and a diameter of the contraction part at a connection portion may be greater than a diameter of the expansion part and a diameter of the contraction part at end portions of the expansion part and an end portion of the contraction part.

A diameter of the expansion part and a diameter of the contraction part may gradually increase from the end portions to the connection portion.

The cone valve may further include a handle connected to the worm.

The cone valve may further include a motor connected to the worm.

To achieve the above objects, there is provided a cone valve, which may include, but is not limited to, a hollow body unit, the hollow body unit including a left body and a right body having a fluid outlet port and a fluid inlet port, respectively, the left body and the right body including a left valve inclination surface and a right valve inclination surface, respectively, a cone disposed inside the hollow body unit in a apace between the left body and the right body, the cone including an expansion part and a contraction part respectively opposing the left valve inclination surface and a right valve inclination surface, the expansion part and the contraction part being inclined corresponding to the left valve inclination surface and the right valve inclination surface, respectively, a cylindrical forward and backward movement unit movably connected to an outside circumference of the hollow body, the cylindrical forward and backward movement unit including a helix formed on an outer circumference, a fixing piece connecting the cone and the cylindrical forward and backward movement unit, and an external worm gear engaged with the cylindrical forward and backward movement unit to the helix.

The cone valve may further including a flange installed at both ends of the body unit.

The cone valve may further including a worm engaged with the external worm gear.

A diameter of the expansion part and a diameter of the contraction part at a connection portion may be greater than a diameter of the expansion part and a diameter of the contraction part at end portions of the expansion part and an end portion of the contraction part.

A diameter of the expansion part and a diameter of the contraction part may gradually increase from the end portions to the connection portion.

The cone valve may further include a handle connected to the worm.

The cone valve may further include a motor connected to the worm.

The cylindrical forward and backward movement unit may include a key groove formed on an outer circumference, the left body unit may include a key groove formed on an inner circumference of the left body unit, and a key may be inserted into the key groove formed on an outer circumference of the cylindrical forward and backward movement unit and the key groove formed on an inner circumference of the left body unit.

To achieve the above objects, there is provided a method for manufacturing a cone for a cone valve, which may include, but is not limited to, a process wherein a cone which is installed inside a hollow body unit through which fluid flows, wherein the body unit is provided with left and right bodies, and the cone is disposed between the left and right bodies, left and right valve inclination surfaces are defined, inclined corresponding to an inclination surface of the cone, at the front ends of the left and right bodies, whereupon the cone can reciprocate forward and backward, thus opening or closing a flow passage, wherein the cone is fixedly engaged to a cylindrical forward and backward movement unit installed at an outer circumference of the body unit, and a helix is defined at an outer circumference of the cylindrical forward and backward movement unit, and the cylindrical forward and backward movement unit is engaged movable forward and backward with an external worm gear, and the worm gear is engaged with a worm, and the worm is connected with a motor or a handle, and the torque of the motor or the handle sequentially rotates the worm and the worm gear and then moves forward and backward the cylindrical forward and backward movement unit, and the cone fixedly engaged to the cylindrical forward and backward movement unit, wherein the cone is provided with an expansion part the diameter of which gradually increases in the direction of its rear portion and which is inclined, and a contraction part which extends from the expansion part and the diameter of which gradually decreases in the direction of its rear portion and which is inclined, whereupon the cone can move forward or backward by the torque of the motor or the handle installed external to the body unit, and then the contraction part of the cone can move close to the right valve inclination surface or can separate therefrom, thus opening or closing the flow passage.

According to the present inventive concept, since the configuration of a valve is simple, manufacturing and operations are convenient. Turbulence may occur less during the opening and closing, and abrasion damage to a valve seat may rarely occur. Since the cone inside the body unit is able to reliably open or close the flow passage, error may occur less, and maintenance cost can be reduced.

Moreover, according to the present inventive concept, the number of necessary valve components is less, and the configuration is simple, for which manufacturing and operations are convenient, and turbulence may occur less during the opening or closing, and an abrasion damage to a valve seat is less, and since the cone inside the body unit is able to fast and reliably open or close the flow passage, errors may rarely occur, and any maintenance cost can be saved.

Furthermore, according to the present inventive concept, the number of necessary valve components is less, and a valve configuration is simple, for which manufacturing is easy, and operations are convenient. Turbulence may occur less during the opening or closing, and abrasion damage to a valve seat is less, and since the cone inside the body unit is able to fast and surely open or close the flow passage, errors may occur less, and any maintenance cost can be saved, and it is easier to manufacture the cone.

BRIEF DESCRIPTION OF THE DRAWINGS

The above and other features of the present inventive concept will now be described in detail with reference to certain exemplary embodiments thereof illustrated the accompanying drawings which are given herein below by way of illustration only, and thus are not limitative of the present inventive concept, and wherein.

In the figures, reference numbers refer to the same or equivalent parts of the present inventive concept throughout the several figures of the drawing.

DETAILED DESCRIPTION

Figure 1:
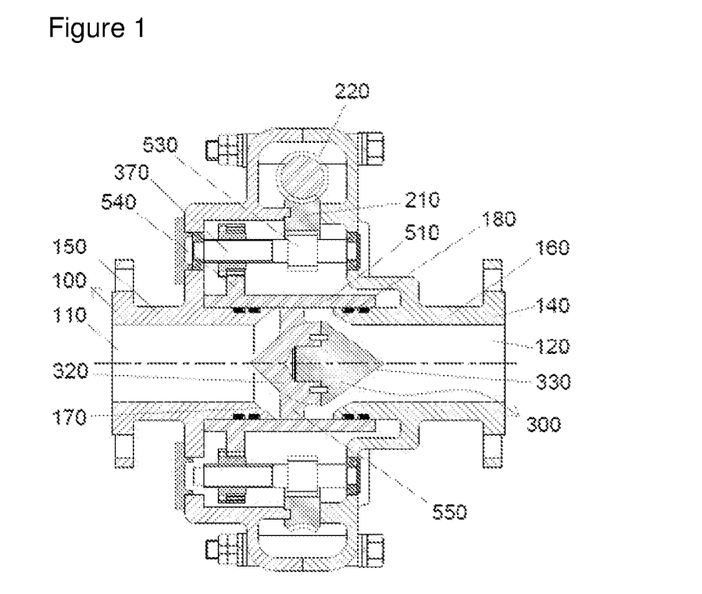
FIG. 1 is a cross sectional view for describing an operation of a cone valve according to the present inventive concept (a flow passage is open after a cone has moved forward)
Figure 2:
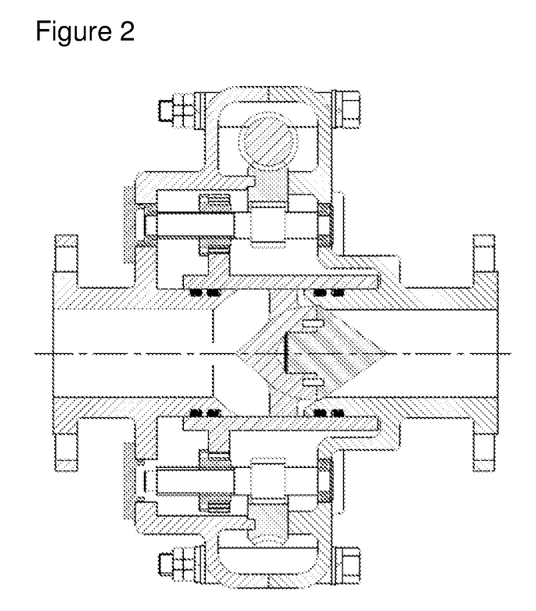
FIG. 2 is a cross sectional view for describing an operation of a cone valve according to the present inventive concept (a flow passage is closed after a cone have moved backward)

The present inventive concept is directed to a cone valve which may include, but is not limited to, a cone 300 which is installed inside a hollow body unit 100 through which fluid flows, wherein the body unit 100 is provided with left and right bodies 150 and 160, and the cone is disposed between the left and right bodies 150 and 160, left and right valve inclination surfaces 170 and 180 are defined inside a fluid outlet port 110 and a fluid inlet port 120, respectively, the left and right valve inclination surfaces 170 and 180 are inclined corresponding to an inclination surface of the cone 300 and disposed at the ends of the left and right bodies 150 and 160 which are close to the cone 300, wherein the cone 300 can reciprocate forward and backward, thus opening or closing a flow passage, wherein the cone 300 is connected integral by a fixing piece 550 to a cylindrical forward and backward movement unit 510 which is installed at an outer circumference of the body unit 100, and an engaging piece 540 is integrally provided on an outer circumference of the cylindrical forward and backward movement unit 510, and a horizontal hole having a helix is defined at the engaging piece 540, and a power transfer shaft is engaged with the horizontal hole having a helix, and a driving gear 530 is engaged with the power transfer shaft 370, and the driving gear 530 is engaged rotatable with an external worm gear 210, and the worm gear 210 is engaged with a worm 220, and the worm 220 is connected with a motor or a handle (not shown), whereby the torque of the motor or the handle sequentially rotates the worm 220, the external worm gear 210, the driving gear 530 and the power transfer shaft 370, thus moving forward or backward the cylindrical forward and backward movement unit 510 engaged to the power transfer shaft 370, and the cone 300 connected integral to the cylindrical forward and backward movement unit 510, wherein the cone 300 is provided with an expansion part 320, the diameter of which gradually increases in the direction of its rear portion, and a contraction part 330 which extends from the expansion part 320 and the diameter of which gradually decreases in the direction of its rear portion, whereupon the cone 300 can move forward or backward by the torque of the motor or the handle installed external to the body unit, and then the contraction part 330 of the cone 300 can move close to the right valve inclination surface 180 or can separate therefrom, thus opening or closing the flow passage.

Moreover, a flange 140 is installed at both ends of the body unit 100.

Figure 3:
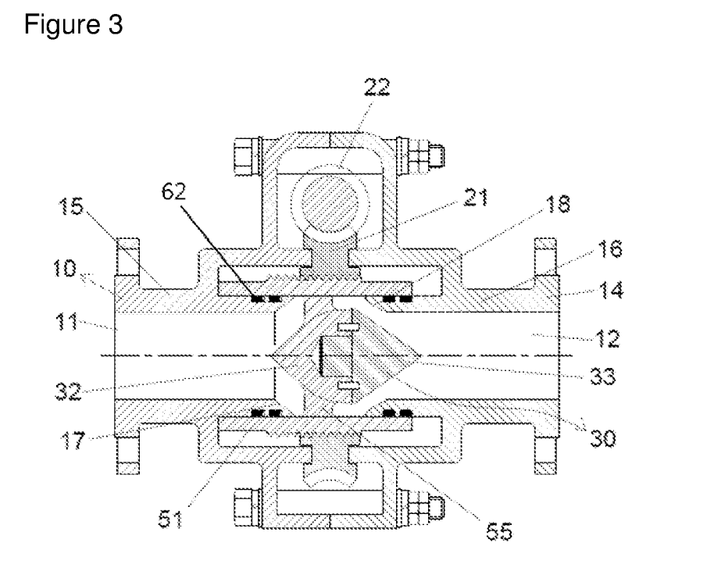
FIG. 3 is a cross sectional view for describing an operation of a cone valve according to the present inventive concept (a flow passage is open after a cone has moved forward)
Figure 4:
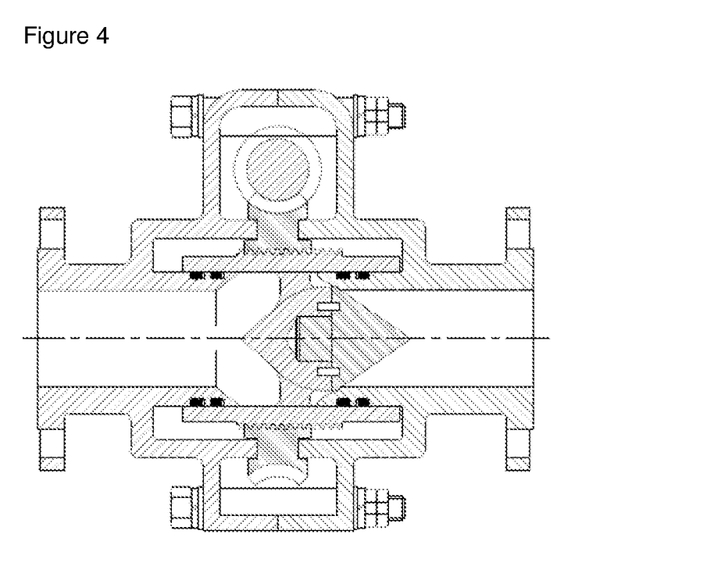
FIG. 4 is a cross sectional view for describing an operation of a cone valve according to the present inventive concept (a flow passage is closed after a cone has moved backward)

The present inventive concept is directed to a cone valve, which may include, but is not limited to, a cone 30 which is installed inside a hollow body unit 10 through which fluid flows, wherein the hollow body unit 10 is provided with left and right bodies 15 and 16, and the cone is disposed between the left and right bodies 15 and 16, left and right valve inclination surfaces 17 and 18 are defined inside a fluid outlet port 11 and a fluid inlet port 12, respectively, the left and right valve inclination surfaces 17 and 18 are inclined corresponding to an inclination surface of the cone 30 and disposed at the ends of the left and right bodies 15 and 16 which are close to the cone 30, wherein the cone 30 can reciprocate forward and backward, thus opening or closing a flow passage, wherein the cone 30 is fixedly engaged to a cylindrical forward and backward movement unit 51 installed at an outer circumference of the body unit 10, and a helix is defined at an outer circumference of the cylindrical forward and backward movement unit 51, and the cylindrical forward and backward movement unit 51 is movably engaged with an external worm gear 21, and the worm gear 21 is engaged with a worm 22, and the worm 22 is connected with a motor or a handle (not shown), and the torque of the motor or the handle sequentially rotates the worm 22 and the worm gear 21 and then moves forward and backward the cylindrical forward and backward movement unit 51, and the cone 30 fixedly engaged to the cylindrical forward and backward movement unit 51 by a fixing piece 55, wherein the cone 30 is provided with an expansion part 32 the diameter of which gradually increases in the direction of its rear portion, and a contraction part 33 which extends from the expansion part 32 and the diameter of which gradually decreases in the direction of its rear portion, wherein the cone 30 can move forward or backward by the torque of the motor or the handle installed external to the body unit, and then the contraction part 33 of the cone 30 can move close to the right valve inclination surface 18 or can separate therefrom, thus opening or closing the flow passage.

Moreover, a flange 14 is installed at both ends of the body unit 10.

The present inventive concept is directed to a method for manufacturing a cone for a cone valve, which may include, but is not limited to, a process wherein a cone 30 which is installed inside a hollow body unit 10 through which fluid flows, wherein the body unit 10 is provided with left and right bodies 15 and 16, and the cone is disposed between the left and right bodies 15 and 16, left and right valve inclination surfaces 17 and 18 are defined inside a fluid outlet port 11 and a fluid inlet port 12, respectively, the left and right valve inclination surfaces 17 and 18 are inclined corresponding to an inclination surface of the cone 30, the left and right valve inclination surfaces 17 and 18 are disposed at the ends of the left and right bodies 15 and 16 which are close to the cone 30, wherein the cone 30 can reciprocate forward and backward, thus opening or closing a flow passage, wherein the cone 30 is fixedly engaged to a cylindrical forward and backward movement unit 51 installed at an outer circumference of the body unit 10, and a helix is defined at an outer circumference of the cylindrical forward and backward movement unit 51, and the cylindrical forward and backward movement unit 51 is movably engaged with an external worm gear 21, and the worm gear 21 is engaged with a worm 22, and the worm 22 is connected with a motor or a handle (not shown), and the torque of the motor or the handle sequentially rotates the worm 22 and the worm gear 21 and then moves forward and backward the cylindrical forward and backward movement unit 51, and the cone 30 fixedly engaged to the cylindrical forward and backward movement unit 51, wherein the cone 30 is provided with an expansion part 32 the diameter of which gradually increases in the direction of its rear portion, and a contraction part 33 which extends from the expansion part 32 and the diameter of which gradually decreases in the direction of its rear portion, whereupon the cone 30 can move forward or backward by the torque of the motor or the handle installed external to the body unit, and then the contraction part 33 of the cone 30 can move close to the right valve inclination surface 18 or can separate therefrom, thus opening or closing the flow passage, and wherein the expansion part 32 and the cylindrical forward and backward movement unit 51 are engaged by a fixing piece and are integrally molded by a mold, and the mold is provided with an upper mold 60 having an upper product molding space 61a and a lower mold 70 having a lower product molding space 71a, and a chiller 82 is built in at the lower surface of the lower product molding space 71a of the lower mold, and a feeder head 81 is provided at a mouth of the mold, and when a melted fluid is injected, the lower mold portion is first cooled by the chiller 82 of the lower mold 70, and the feeder head 81 allows the fluid into every corner of the mold, and a threaded part is machine-processed at an outer circumference of the thusly manufactured cylindrical forward and backward movement unit 51.

The cone valve according to the present inventive concept will be described with reference to the accompanying drawings.

Figure 5:
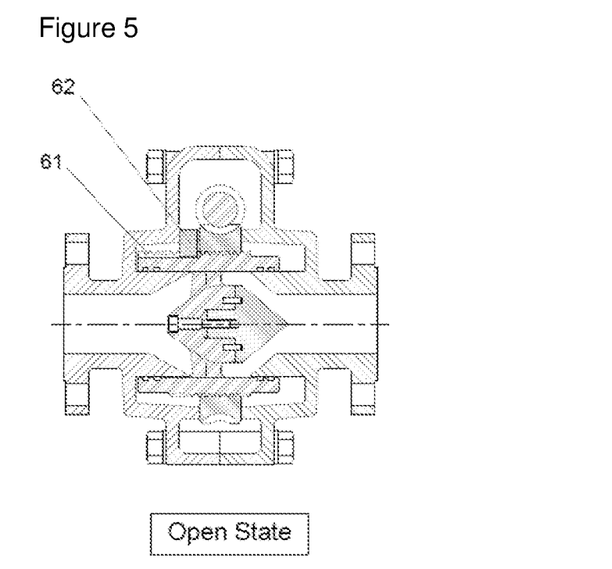
FIG. 5 is a cross sectional view illustrating a state where a key groove and a key are disposed at a cone valve according to the present inventive concept (a flow passage is open after a cone has moved forward)
Figure 6:
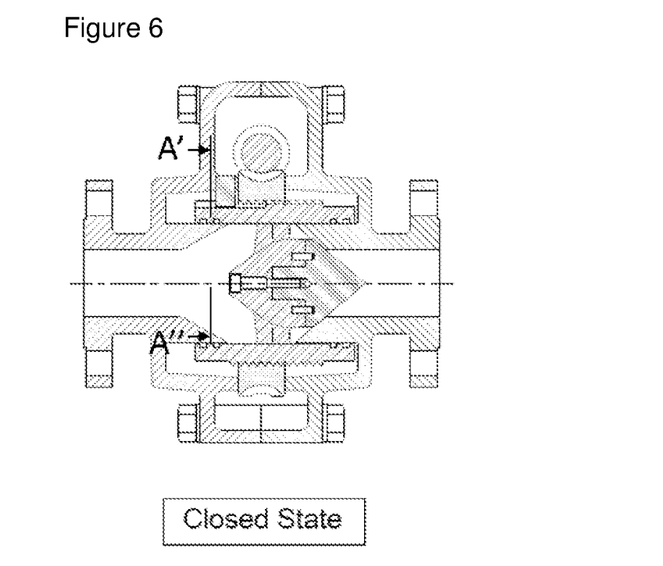
FIG. 6 is a cross sectional view illustrating a state where a key groove and a key are disposed at a cone valve according to the present inventive concept (a flow passage is closed after a cone has moved backward)
Figure 7:
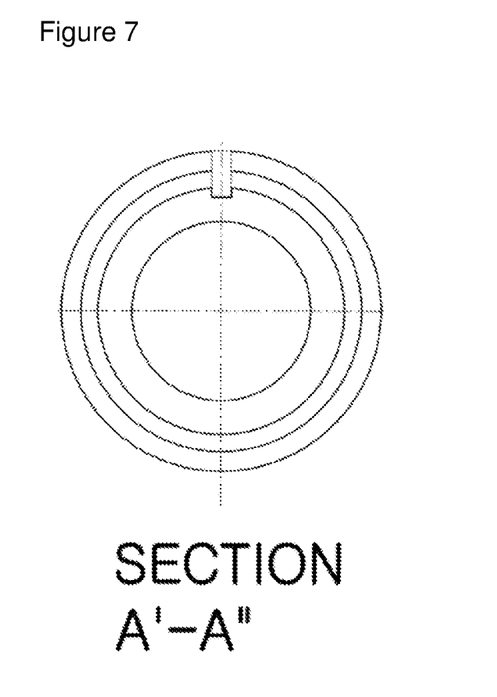
FIG. 7 is a cross sectional view taken along line A'-A" in FIG. 4.
Figure 8:
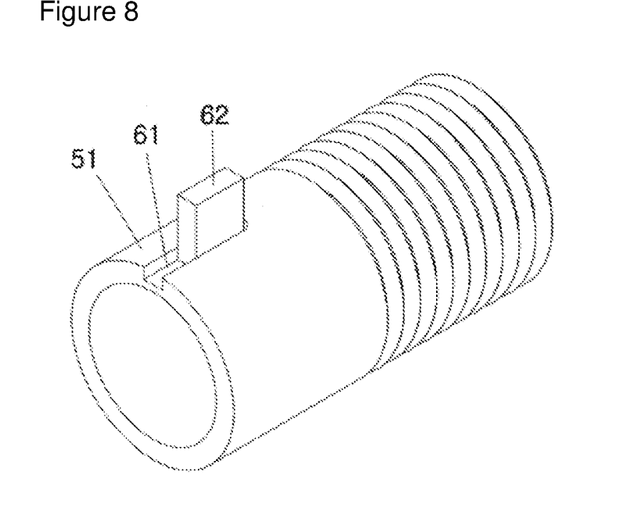
FIG. 8 is a detailed view illustrating a key groove of a cone valve according to the present inventive concept.
Figure 9:
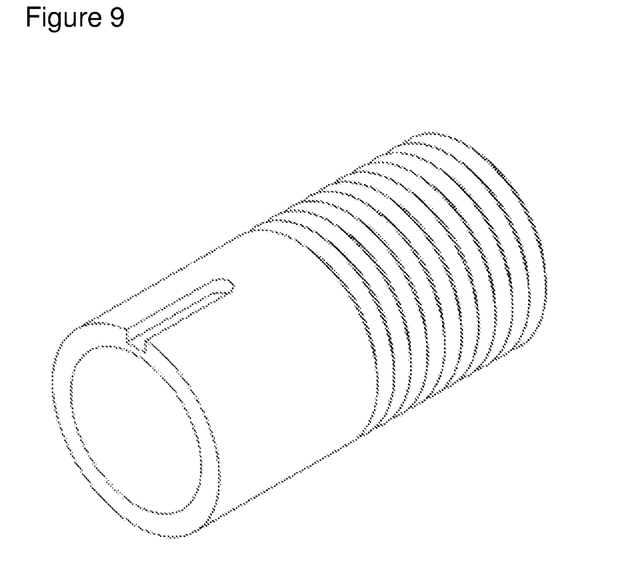
FIG. 9 is a detailed view illustrating a key groove and a key of a cone valve according to the present inventive concept.
Figure 10:
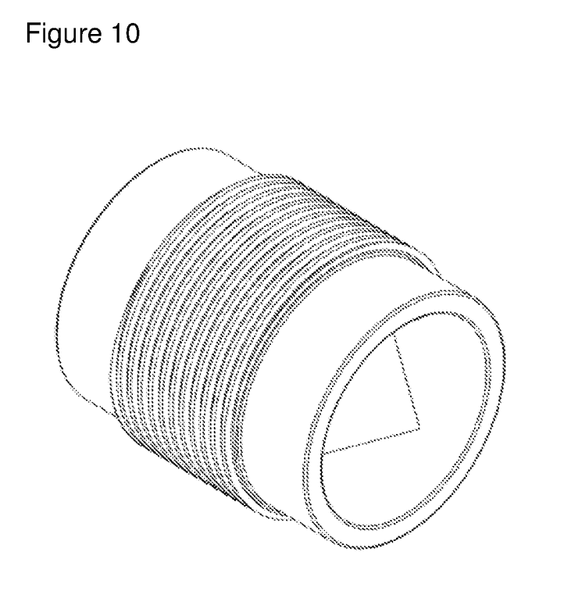
FIG. 10 is a perspective view illustrating a forward and backward movement body wherein a cone of a cone valve is engaged according to the present inventive concept.
Figure 11:
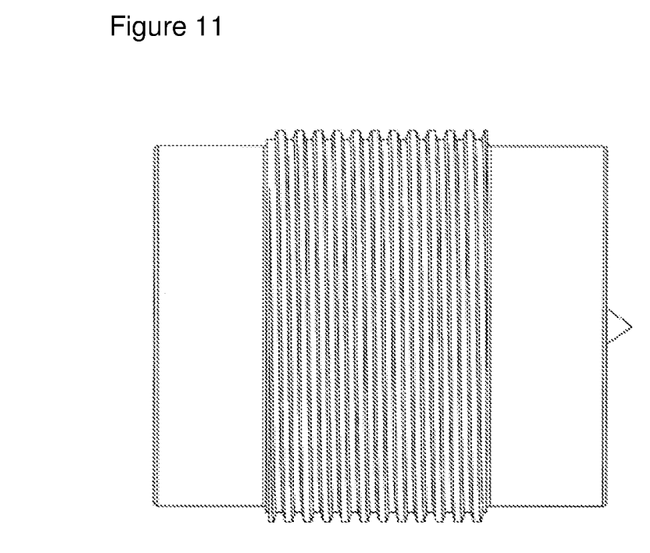
FIG. 11 is a front view illustrating a forward and backward movement body wherein a cone of a cone valve is engaged according to the present inventive concept.
Figure 12:
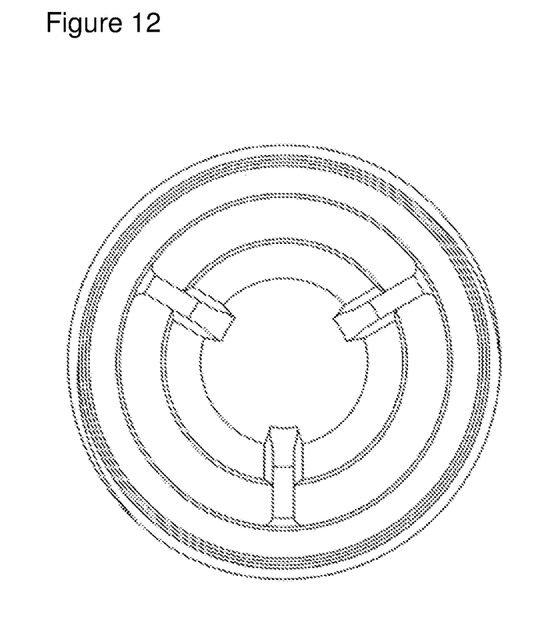
FIG. 12 is a left view illustrating a forward and backward movement body wherein a cone of a cone valve is engaged according to the present inventive concept.
Figure 13:
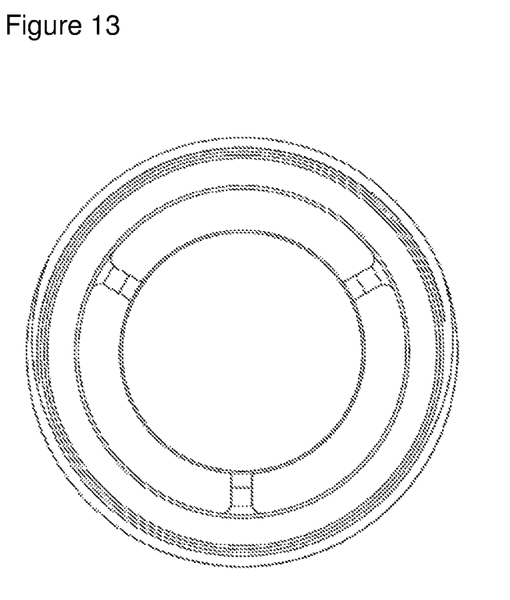
FIG. 13 is a right view illustrating a forward and backward movement body wherein a cone of a cone valve is engaged according to the present inventive concept.
Figure 14:
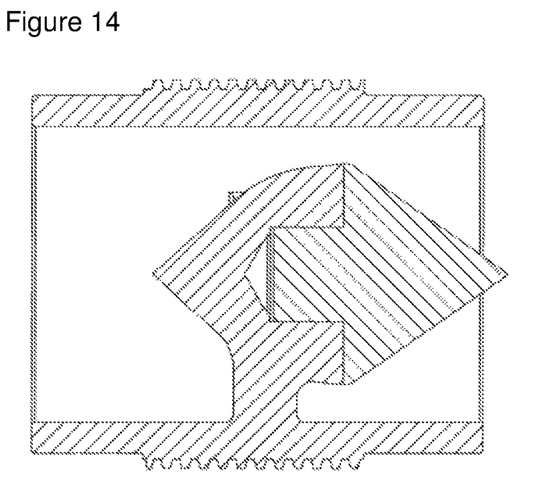
FIG. 14 is a cross sectional view illustrating a forward and backward movement body wherein a cone of a cone valve is engaged according to the present inventive concept.
Figure 15:
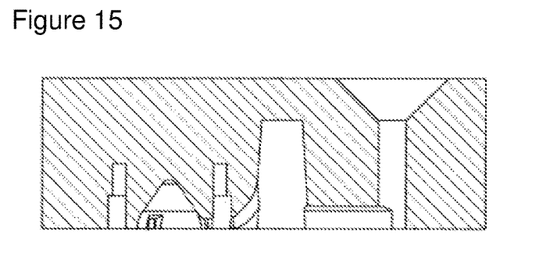
FIG. 15 is a cross sectional view illustrating a cone upper mold of a cone valve according to the present inventive concept.
Figure 16:
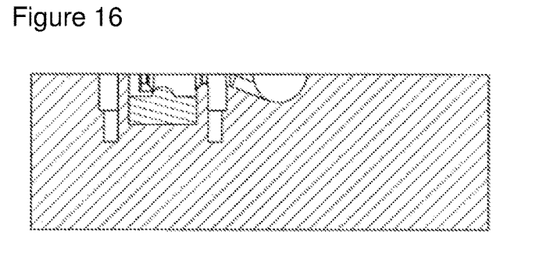
FIG. 16 is a cross sectional view illustrating a cone lower mold of a cone valve according to the present inventive concept.
Figure 17:
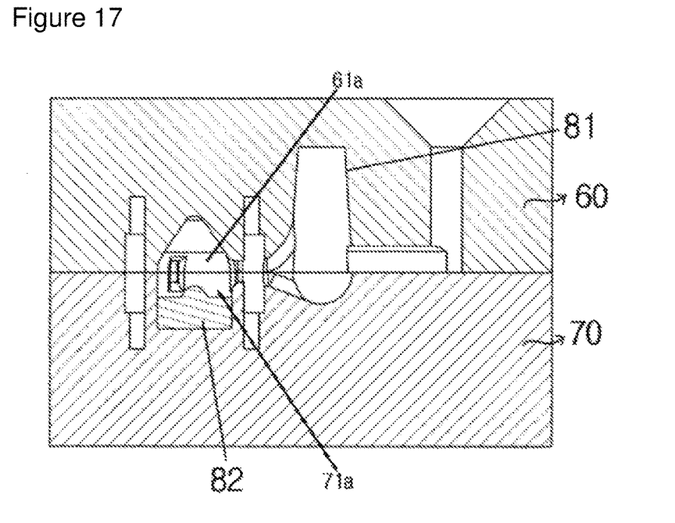
FIG. 17 is a cross sectional view illustrating an engagement of a cone upper mold and a cone lower mold of a cone valve according to the present inventive concept.

FIG. 1 is a cross sectional view for describing an operation of a cone valve according to the present inventive concept (a flow passage is open after a cone has moved forward), FIG. 2 is a cross sectional view for describing an operation of a cone valve according to the present inventive concept (a flow passage is closed after a cone have moved backward), FIG. 3 is a cross sectional view for describing an operation of a cone valve according to the present inventive concept (a flow passage is open after a cone has moved forward), FIG. 4 is a cross sectional view for describing an operation of a cone valve according to the present inventive concept (a flow passage is closed after a cone has moved backward), FIG. 5 is a cross sectional view illustrating a state where a key groove and a key are disposed at a cone valve according to the present inventive concept (a flow passage is open after a cone has moved forward), FIG. 6 is a cross sectional view illustrating a state where a key groove and a key are disposed at a cone valve according to the present inventive concept (a flow passage is closed after a cone has moved backward), FIG. 7 is a cross sectional view taken along line A'-A" in FIG. 4, FIG. 8 is a detailed view illustrating a key groove of a cone valve according to the present inventive concept, FIG. 9 is a detailed view illustrating a key groove and a key of a cone valve according to the present inventive concept, FIG. 10 is a perspective view illustrating a forward and backward movement body wherein a cone of a cone valve is engaged according to the present inventive concept, FIG. 11 is a front view illustrating a forward and backward movement body wherein a cone of a cone valve is engaged according to the present inventive concept, FIG. 12 is a left view illustrating a forward and backward movement body wherein a cone of a cone valve is engaged according to the present inventive concept, FIG. 13 is a right view illustrating a forward and backward movement body wherein a cone of a cone valve is engaged according to the present inventive concept, FIG. 14 is a cross sectional view illustrating a forward and backward movement body wherein a cone of a cone valve is engaged according to the present inventive concept, FIG. 15 is a cross sectional view illustrating a cone upper mold of a cone valve according to the present inventive concept, FIG. 16 is a cross sectional view illustrating a cone lower mold of a cone valve according to the present inventive concept, and FIG. 17 is a cross sectional view illustrating an engagement of a cone upper mold and a cone lower mold of a cone valve according to the present inventive concept.

According to one inventive concept, a cone 300 is installed inside a hollow body unit 100 wherein fluid flows. The body unit 100 is provided with left and right bodies 150 and 160. The cone is installed in a space between the left and right bodies 150 and 160. Left and right valve inclination surfaces 170 and 180 are defined at the ends of the left and right bodies 150 and 160 and are slanted corresponding to the inclined surface of the cone 300. The flow passage can be opened or closed since the cone 300 reciprocates forward or backward.

The aforementioned cone 300 is integrally connected to a fixing piece 550 which is disposed inside the cylindrical forward and backward movement unit 510. An engaging piece 540 is disposed on an outer circumference of the cylindrical forward and backward movement unit 510. A horizontal hole having a helix may be formed in the engaging piece. A helix is also formed at an outer diameter portion of a power transfer shaft 370, while corresponding to the aforementioned helix. Both ends of the power transfer shaft 370 are rotatably supported by the hollow body unit 100 and are not movable forward or backward, wherein the cylindrical forward and backward movement unit 510 can move forward or backward since the power transfer shaft 370 rotates.

Another fixing piece may be further provided at the cylindrical forward and backward movement unit 510, so that two fixing pieces can be disposed symmetrical. In case of a large diameter configuration, three, four, six or eight fixing pieces may be provided.

The power transfer shaft 370 is horizontally installed in the horizontal hole of the engaging piece 540 and the driving gear 530. The driving gear 530 may be engaged with an external worm gear 210. Since a worm gear 210 may be engaged to a worm 220, and a motor shaft is connected to the worm 220, the torque of the motor can be transferred to the inside driving gear via the worm and the worm gear, and the torque of the driving gear may rotate the power transfer shaft and may move forward or backward the cylindrical forward and backward movement unit 510 installed together at the power transfer shaft 370, thus transferring forward or backward the cone 300 which is fixedly connected to the inside of the cylindrical forward and backward movement unit 510.

In the present inventive concept, a handle, instead of the motor shaft, may be connected to the worm whereby the operation can be carried out manually.

The cone 300 according to the present inventive concept may include an expansion part 320, the diameter of which gradually increases in the direction of its rear portion, and a contraction part 330 which integrally extends from the expansion part and the diameter of which gradually decreases in the direction of its rear portion. The expansion part 320 and the contraction part 330 may be provided separable from each other and then may be engaged together using a bolt. However, the expansion part 320 and the contraction part 330 may be manufactured integral, not separated.

The expansion part 320 may be a cone holder for maintaining a position of the cone 300 inside the hollow body unit. The expansion part 320 may be made of stainless steel, cast steel, cast iron or special steel like the body unit, and the cone of the contraction part 330 may be made of a nonferrous alloy material, for example, stainless steel, nylon, copper, etc.

A space, therefore, may be formed between the inside of the hollow body unit 100 and the cone 300 in order for fluid to flow through the space.

The cone 300 can move forward or backward by the torque of the motor of the handle installed external to the body unit, so the contraction part 330 of the cone 300 can move close to the right valve inclination surface 180 or may separate therefrom, thus controlling the fluid flows through the cone valve, for example, opening or closing the flow passage.

If the cone moves to the right, the portion between the left valve inclination surface 170 and the cone expansion part 320 may increase, and the portion between the right valve inclination surface 180 and the cone contraction part 330 may decrease, thus, the fluid flows through the fluid outlet port 110 may decrease. On the contrary, if the cone moves left, the portion between the left valve inclination surface 170 and the cone expansion part 320 may decrease, and the portion between the right valve inclination surface 180 and the cone contraction part 330 may increase, thus, the fluid flows through the fluid outlet port 110 may decrease.

A flange 140 may be installed at both ends of the body unit 100 for the sake of an easier connection to the front and rear pipes (not shown).

The present inventive concept, therefore, is able to provide a simple valve configuration, which may contribute to easier manufacturing and operations, and turbulence flow does not occur during the opening or closing, and an abrasion damage to a valve seat can be prevented, and since the cone inside the body unit is able to surely open or close the flow passage, errors rarely occur, and maintenance cost can be saved in the present inventive concept.

According to another inventive concept, a cone 30 may be installed inside a hollow body unit 10 wherein fluid can flow. The hollow body unit 10 may be provided with left and right body units 15 and 16. The cone 33 may be installed between the left and right body units 15 and 16. Left and right valve inclination surfaces 17 and 18 may be formed at ends of the left and right body units 15 and 16, respectively, and may be inclined corresponding to the inclination surface of the cone 30, wherein since the cone 30 reciprocates forward or backward, the flow passage can be open or closed.

The cone 30 may be connected integral to a fixing piece 55 disposed inside a cylindrical forward and backward movement unit 51. Since a helix is formed at an outer circumference of the cylindrical forward and backward movement unit 51, the cylindrical forward and backward movement unit 51 can be movably engaged to an external worm gear 21. Moreover, the external worm gear 21 may be engaged to a worm 22, and the worm 22 is connected to a motor or a handle (not shown), so that the torque of the motor or the handle is able to sequentially rotate the worm 22 and the external worm gear 21 and is able to move forward or backward the cylindrical forward and backward movement unit 51, and the cone 30 which is fixedly engaged to the cylindrical forward and backward movement unit 51.

Another fixing piece of the cylindrical forward and backward movement unit 51 may be further provided, so two fixing pieces may be disposed symmetrical. In case of a larger diameter configuration, three, four, six or eight fixing pieces may be employed.

In the present inventive concept, a handle (not shown) may be connected to the worm 22 instead of the motor shaft, so the operation can be carried out manually.

The cone 30 according to the present inventive concept may include an expansion part 32, the diameter of which gradually increases in the direction of its rear portion, and a contraction part 33 which integrally extends from the expansion part and the diameter of which gradually decreases in the direction of its rear portion. The expansion part 32 and the contraction part 33 may be provided separable from each other and then may be engaged together using a bolt, otherwise they may be manufactured integral, not separated.

In this case, the expansion part 32 may be a cone holder for fixing the position of the cone 30 inside the hollow body unit 10, and the expansion part 32 may be made of stainless steel, cast steel, cast iron or special steel like the body unit, and the cone of the contraction part 33 may be made of a nonferrous alloy material, for example, stainless steel, nylon, copper, etc.

A space, therefore, may be formed between the inside of the body unit and the cone in order for fluid to flow through the space.

The cone 30 can move forward or backward by the torque of the motor of the handle installed external to the body unit, so the contraction part 33 of the cone 30 can move close to the right valve inclination surface 18 or may separate therefrom, thus controlling the amount of fluid flows through the value, for example, opening or closing the flow passage.

If the cone 30 moves to the right, the portion between the left valve inclination surface 17 and the cone expansion part 32 may increase, and the portion between the right valve inclination surface 18 and the cone contraction part 33 may decrease, thus, the amount of the fluid flows through the fluid outlet port 11 may decrease. On the contrary, if the cone 30 moves to the left, the portion between the left valve inclination surface 17 and the cone expansion part 32 may decrease, and the portion between the right valve inclination surface 18 and the cone contraction part 33 may increase, thus, the fluid flows through the fluid outlet port 11 may increase.

A flange 14 may be installed at both ends of the body unit 10 for the sake of an easier connection to the front and rear pipes.

Meanwhile, when the external worm gear 21 rotates, the cylindrical forward and backward movement unit 51 contacting with the worm gear can move forward or backward. In order to prevent the rotation of the cylindrical forward and backward movement unit 51 together with the external worm gear 21 when the external worm gear 21 rotates, a key groove 61 is formed at an upper surface of the cylindrical forward and backward movement unit 51, and one end of the key 62 is fixedly inserted into a wall surface of the left body unit, and the other end of the key is inserted into the key groove 61. The key is fixedly inserted into the wall surface of the left body unit in such a way that the key groove can move relatively with the key in the longitudinal direction.

For this reason, if the external worm gear 21 rotates by the worm 22, the cylindrical forward and backward movement unit 51 contacting with the external worm gear 21 can move forward and backward, and since the key groove 61 is formed at the upper surface of the cylindrical forward and backward movement unit 51, and the other end of the key is inserted therein, the cylindrical forward and backward movement unit 51 can move only in the forward and backward directions, not rotating.

The key groove 61 is formed long enough for the key 62 to move forward and backward, and the horizontal length of the key 62 inserted into the key groove 61 is provided shorter than the key groove 61. For this reason, if the cylindrical forward and backward movement unit 51 moves forward or backward by the rotation of the external worm gear 21, the key 62 inside the key groove 61 will not interfere with the forward and backward movements of the cylindrical forward and backward movement unit 51, while interrupting the rotation of the cylindrical forward and backward movement unit 51.

In the present inventive concept, the number of necessary valve components is less, and the configuration is simple, and the manufacturing and operations are easy, and any turbulence flow does not occur during the opening and closing, and an abrasion damage to the valve seat does not occur, and the cone inside the body unit can fast and surely open or close the flow passage, for which errors rarely occur, and any maintenance cost can be saved.

The present inventive concept is directed to a cone valve. A cone 30 may be installed inside a hollow body unit 10 wherein fluid can flow. The body unit 10 may be provided with left and right body units 15 and 16. The cone may be installed in a space between the left and right body units 15 and 16. Left and right valve inclination surfaces 17 and 18 may be formed at the ends of the left and right body units 15 and 16 and may be inclined corresponding to the inclination surface of the cone 30, wherein since the cone 30 reciprocates forward or backward, the flow passage can be open or closed.

The cone 30 may be connected integral to a fixing piece 55 disposed inside a cylindrical forward and backward movement unit 51. Since a helix is formed at an outer circumference of the cylindrical forward and backward movement unit 51, the cylindrical forward and backward movement unit 51 can be movably engaged to an external worm gear 21. Moreover, the external worm gear 21 may be engaged to a worm 22, and the worm 22 is connected to a motor of a handle, so the torque of the motor or the handle is able to sequentially rotate the worm 22 and the worm gear 21 and is able to move forward or backward the cylindrical forward and backward movement unit 51, and the cone 30 which is fixedly engaged to the cylindrical forward and backward movement unit 51.

Another fixing piece of the cylindrical forward and backward movement unit 51 may be further provided, so two fixing pieces may be disposed symmetrical. In case of a larger diameter configuration, three, four, six or eight fixing pieces may be employed.

In the present inventive concept, a handle may be connected to the worm instead of the motor shaft, so the operation can be carried out manually.

The cone 30 according to the present inventive concept may include an expansion part, the diameter of which gradually increases in the direction of its rear portion, and a contraction part which integrally extends from the expansion part and the diameter of which gradually decreases in the direction of its rear portion. The expansion part 32 and the contraction part 33 may be provided separable from each other and then may be engaged together using a bolt, otherwise they may be manufactured integral, not separated.

In this case, the expansion part 32 may be a cone holder for maintaining a position of the cone 30 in the hollow body unit 10, and the expansion part 32 may be made of stainless steel, cast steel, cast iron or special steel like the body unit, and the cone of the contraction part 33 may be made of a nonferrous alloy material, for example, stainless steel, nylon, copper, etc.

A space, therefore, may be formed between the inside of the body unit and the cone in order for fluid to flow through the space.

The cone 30 can move forward or backward by the torque of the motor of the handle installed external to the body unit, so the contraction part 33 of the cone 30 can move close to the right valve inclination surface 18 or may separate therefrom, thus opening or closing the flow passage.

If the cone moves to the right, the portion between the left valve inclination surface 17 and the cone expansion part 32 may increase, and the portion between the right valve inclination surface 18 and the cone contraction part 33 may decrease, thus, the fluid flow through the fluid outlet port 11 may decrease. On the contrary, if the cone moves to the left, the portion between the left valve inclination surface 17 and the cone expansion part 32 may decrease, and the portion between the right valve inclination surface 18 and the cone contraction part 33 may increase, whereby the fluid flows through the fluid outlet port 11 may increase.

A flange 14 may be installed at both ends of the body unit 10 for the sake of an easier connection to the front and rear pipes.

Meanwhile, when the worm gear rotates, the cylindrical forward and backward movement unit 51 contacting with the external worm gear 21 can move forward or backward. In order to prevent the rotation of the cylindrical forward and backward movement unit 51 together with the external worm gear 21 when the external worm gear 21 rotates, a key groove 61 is formed at an upper surface of the cylindrical forward and backward movement unit 51, and an end of the key 62 corresponding thereto is fixedly inserted into a wall surface of the left body unit 15, and the other end of the key 62 is inserted into the key groove 61. The key is fixedly inserted into the wall surface of the left body unit 15 in such a way that the key groove 61 can move relatively with the key in the longitudinal direction.

For this reason, if the external worm gear rotates by the worm, the cylindrical forward and backward movement unit contacting with the worm gear can move forward and backward, and since the key groove is formed at the upper surface of the cylindrical forward and backward movement unit, and the other end of the key is inserted therein, the cylindrical forward and backward movement unit can move only in the forward and backward directions, not rotating.

The key groove is formed long enough for the key to move forward and backward, and the horizontal length of the key inserted into the key groove is provided shorter than the key groove. For this reason, if the cylindrical forward and backward movement unit moves forward or backward by the rotation of the worm gear, the key inside the key groove will not interfere with the forward and backward movements of the cylindrical forward and backward movement unit, while interrupting the rotation of the cylindrical forward and backward movement unit.

Meanwhile, when manufacturing the cone of the cone valve according to the present inventive concept, the cone expansion part 32 and the cylindrical forward and backward movement unit 51 are engaged by a fixing piece. They are molded integral by a mold. The aforementioned mold is formed of an upper mold 60 and a lower mold 70. A chiller 82 is built in the lower surface of a product molding space 71a of the lower mold 70, and a feeder head 81 is provided at a mouth of the mold. When a melted metal fluid is injected, the mold of the lower side will be first cooled by the chiller 82 of the lower mold, and the feeder head 81 will help to inject the fluid to every corner of the mold, whereupon the product can be manufactured dense with a good quality without any air pores, etc.

A threaded part may be formed at an outer circumference of the cylindrical forward and backward movement body 51 manufactured by the mold-based method in such a way to use a typical machine, for example, a rolling machine. Since the rolling machine method for forming such a threaded part is widely known, the description thereon will be omitted.

According to the present inventive concept, the configuration of the valve is simple, and the manufacturing and operations are easy, and any turbulence occurs less, and an abrasion damage to the valve seat is small, and since the cone of the cone valve is able to fast and surely open and close the flow passage, errors rarely occur, and the maintenance does not cost a lot.

The inventive concept has been described in detail with reference to preferred embodiments thereof. However, it will be appreciated by those skilled in the art that changes may be made in these embodiments without departing from the principles and spirit of the inventive concept, the scope of which is defined in the appended claims and their equivalents.

What is claimed is:

1. A cone valve, comprising:
a hollow body unit, the hollow body unit including a left body and a right body which are directly connected to each other and have a fluid outlet port and a fluid inlet port, respectively, the left body and the right body including a left valve inclination surface and a right valve inclination surface, respectively;
a cone disposed inside the hollow body unit in a space between the left body and the right body, the cone including an expansion part and a contraction part respectively opposing the left valve inclination surface and the right valve inclination surface, the expansion part and the contraction part being directly connected to each other and being inclined corresponding to the left valve inclination surface and the right valve inclination surface, respectively, and the contraction part including an upper portion and a lower portion respectively opposing an upper portion and a lower portion of the right valve inclination surface, wherein the upper portion of the right valve inclination surface is configured to directly contact the upper portion of the contraction part and the lower portion of the right valve inclination surface is configured to directly contact the lower portion of the contraction part when the cone valve is closed and each of the expansion part and the contraction part which includes the upper portion and the lower portion is formed of a same material and formed in one piece monolithically, respectively;
a cylindrical forward and backward movement unit movably connected to an outside circumference of the hollow body, the cylindrical forward and backward movement unit is formed of a same material as and formed in one piece monolithically with the expansion part of the cone;
a fixing piece connecting the cone and the cylindrical forward and backward movement unit; and
a power transfer shaft engaged with the cylindrical forward and backward movement unit, the power transfer shaft moving the cylindrical forward and backward movement unit to open and close the cone valve.

2. The cone valve of claim 1, wherein the cone valve further comprising a flange installed at both ends of the body unit.

3. The cone valve of claim 1, further comprising:
a driving gear engaged with the power transfer shaft;
an external worm gear rotationally engaged with the driving gear; and
a worm engaged with the external worm gear.

4. The cone valve of claim 3, wherein a diameter of the expansion part and a diameter of the contraction part at a connection portion are greater than a diameter of the expansion part and a diameter of the contraction part at end portions of the expansion part and an end portion of the contraction part.

5. The cone valve of claim 4, wherein the diameter of the expansion part and the diameter of the contraction part gradually increase from the end portions to the connection portion.

6. The cone valve of claim 4, further comprising a handle connected to the worm.

7. The cone valve of claim 4, further comprising a motor connected to the worm.

8. A cone valve, comprising:
a hollow body unit, the hollow body unit including a left body and a right body which are directly connected to each other and have a fluid outlet port and a fluid inlet port, respectively, the left body and the right body including a left valve inclination surface and a right valve inclination surface, respectively;
a cone disposed inside the hollow body unit in a space between the left body and the right body, the cone including an expansion part and a contraction part respectively opposing the left valve inclination surface and the right valve inclination surface, the expansion part and the contraction part being directly connected to each other and being inclined corresponding to the left valve inclination surface and the right valve inclination surface, respectively, and the contraction part including an upper portion and a lower portion respectively opposing an upper portion and a lower portion of the right valve inclination surface, wherein the upper portion of the right valve inclination surface is configured to directly contact the upper portion of the contraction part and the lower portion of the right valve inclination surface is configured to directly contact the lower portion of the contraction part when the cone valve is closed;
a cylindrical forward and backward movement unit movably connected to an outside circumference of the hollow body, the cylindrical forward and backward movement unit including a helix formed on an outer circumference;

a fixing piece connecting the cone and the cylindrical forward and backward movement unit; and an external worm gear engaged with the cylindrical forward and backward movement unit to the helix, wherein each of the left body, the right body, the expansion part and the contraction part which includes the upper portion and the lower portion is formed of a same material and formed in one piece monolithically, respectively, and wherein the cylindrical forward and backward movement unit is formed of a same material as and formed in one piece monolithically with the expansion part of the cone.

9. The cone valve of claim 8, further comprising a flange installed at both ends of the body unit.

10. The cone valve of claim 9, further comprising:
a worm engaged with the external worm gear.

11. The cone valve of claim 10, wherein a diameter of the expansion part and a diameter of the contraction part at a connection portion are greater than a diameter of the expansion part and a diameter of the contraction part at end portions of the expansion part and an end portion of the contraction part.

12. The cone valve of claim 11, wherein the diameter of the expansion part and the diameter of the contraction part gradually increase from the end portions to the connection portion.

13. The cone valve of claim 12, further comprising a handle connected to the worm.

14. The cone valve of claim 12, further comprising a motor connected to the worm.

15. The cone valve of claim 12, wherein the cylindrical forward and backward movement unit includes a key groove formed on an outer circumference, the left body unit includes a key groove formed on an inner circumference of the left body unit, and a key is inserted into the key groove formed on an outer circumference of the cylindrical forward and backward movement unit and the key groove formed on the inner circumference of the left body unit.

* * * * *